United States Patent [19]

Lutz et al.

[11] 4,434,879

[45] Mar. 6, 1984

[54] SYSTEM FOR AUTOMATIC ACTUATION OF A MOTOR VEHICLE CLUTCH

[75] Inventors: Dieter Lutz, Schweinfurt; Franz Nagler, Gochsheim; Wolfgang Thieler, Hassfurt-Uchenhofen; Rudy Tellert, Schweinfurt, all of Fed. Rep. of Germany

[73] Assignee: Sachs-Systemtechnik GmbH, Schweinfurt, Fed. Rep. of Germany

[21] Appl. No.: 285,011

[22] Filed: Jul. 20, 1981

[30] Foreign Application Priority Data

Jul. 25, 1980 [DE] Fed. Rep. of Germany ....... 3028251

[51] Int. Cl.³ .............................................. B60K 41/28
[52] U.S. Cl. ............................... 192/0.052; 192/0.092; 74/866
[58] Field of Search ................. 192/0.04, 0.048, 0.052, 192/0.076, 0.092, 3.58, 103 R, 91 R, 101, 0.08; 74/866

[56] References Cited

U.S. PATENT DOCUMENTS

| | | | |
|---|---|---|---|
| 3,946,842 | 3/1976 | Siebers et al. | 192/3.58 |
| 4,083,443 | 4/1978 | Hamada et al. | 192/91 R |
| 4,086,992 | 5/1978 | Hamada et al. | 192/0.076 |
| 4,275,804 | 6/1981 | Szarka et al. | 192/3.58 |
| 4,294,341 | 10/1981 | Swart | 192/0.076 |

*Primary Examiner*—George H. Krizmanich
*Attorney, Agent, or Firm*—Toren, McGeady and Stanger

[57] ABSTRACT

A system for automatic actuation of the clutch of a motor vehicle wherein a pneumatic cylinder operates a normally engaged clutch to disengage the clutch when fluid pressure is applied to the pneumatic cylinder. A valve system operated through a control system vents the pneumatic cylinder to effect engagement of the clutch and applies fluid pressure from a fluid pressure source to disengage the clutch. The control system is responsive to the position of a clutch activating element interposed between the clutch and the pneumatic cylinder as well as to the speed of the motor of the motor vehicle. Additionally, sensors responsive to the operating condition of a manually shiftable transmission also operate to control the fluid pressure condition of the pneumatic cylinder to determine actuation of the clutch.

8 Claims, 1 Drawing Figure

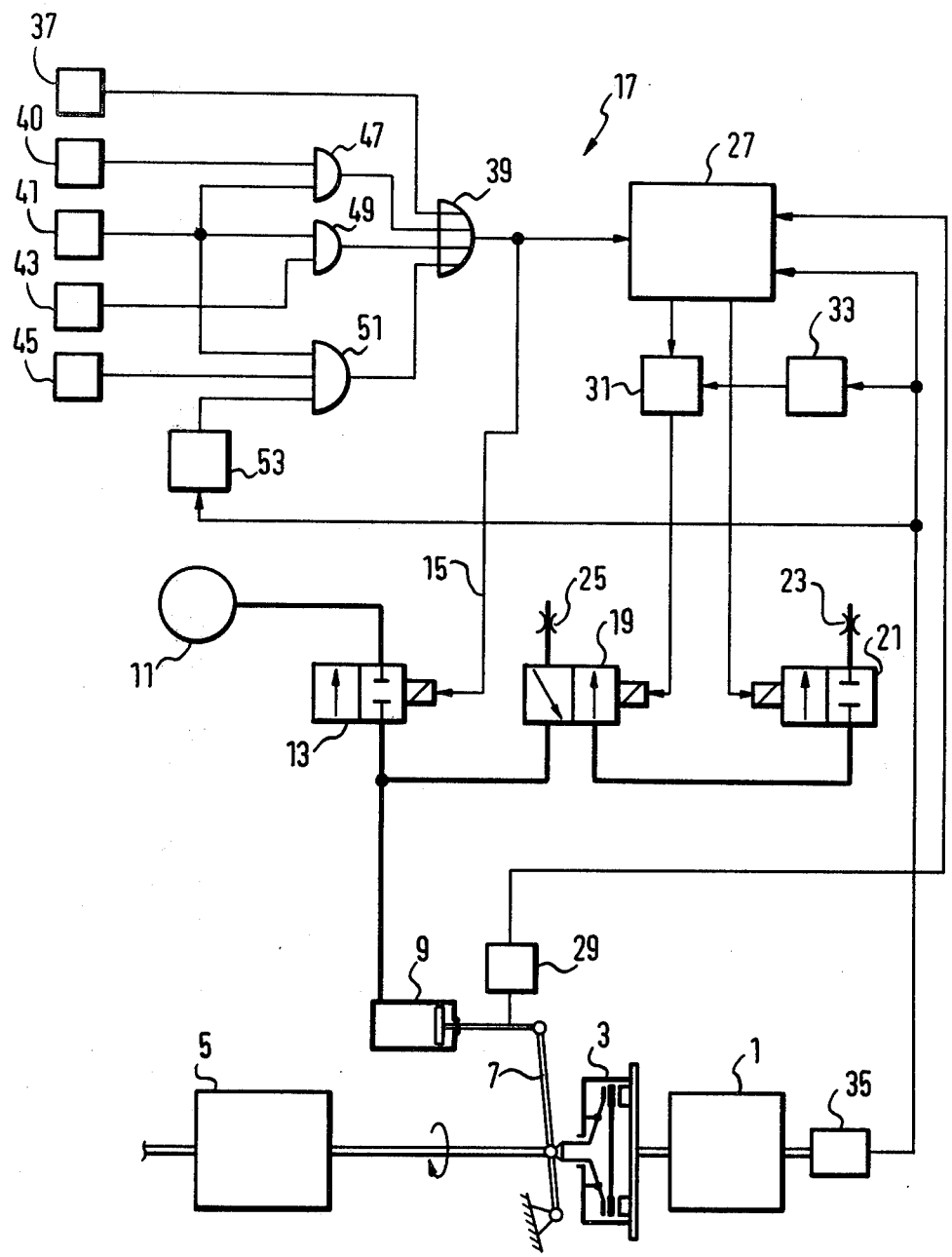

SYSTEM FOR AUTOMATIC ACTUATION OF A MOTOR VEHICLE CLUTCH

The present invention relates generally to a device for the automatic actuation of the friction clutch of a motor vehicle and more particularly to a system wherein the actuating element which operates to effect engagement or disengagement of the clutch is coupled with a controllable drive device.

Systems for automating the process of actuation of the clutch in a motor vehicle customarily utilized torque converters which are relatively expensive because of the high investment costs required due to the structural nature of such systems. In order to reduce the cost of the structural elements involved it has been attempted to provide mechanisms for actuation of conventional motor vehicle friction clutches which utilize centrifugal force switch means which engage the clutch above an idling speed of the motor vehicle engine.

However, these clutches have been shown to be usable only to a limited degree since the clutch engaging characteristics of systems dependent upon rotational speed involve centrifugal force switch means which encounter difficulty with regard to harmonizing the rotational speed-dependent torque characteristics of the engine of the motor vehicle.

In order to enable starting of the engine on a hill or incline, the clutch engagement point of the centrifugal force switch must be set to operate in the area of maximum torque and thus in the area of relatively high engine rotating speeds. As a consequence, even on a flat surface, it is necessary to always start at a relatively high engine rotational speed. This proves to be bothersome especially during forward and rearward maneuvering.

The present invention is directed toward provision of a system which will better adapt to an entire gamut of driving situations of the motor vehicle so that the engaging behavior of a conventional motor vehicle friction clutch may be accomplished automatically.

SUMMARY OF THE INVENTION

The present invention relates generally to a system for automatic actuation of the clutch means of a motor vehicle including a motor comprising: pneumatic cylinder means for effecting engagement and disengagement of the clutch means in accordance with fluid pressure in the cylinder means; connecting means operatively joining the pneumatic cylinder means with the clutch means; fluid pressure source means from which fluid pressure may be supplied to the cylinder means; vent means through which fluid pressure may be vented from the cylinder means; valve means controlling delivery of fluid pressure to the cylinder means from the fluid pressure source means and for venting of the fluid pressure from the cylinder means through the vent means; and control means for controlling operation of the valve means in dependence upon the position of said connecting means and the speed of the motor.

Thus, in accordance with the invention, disadvantages of prior art devices are overcome in that the driving device for the automatic actuation system is constructed as a pneumatic actuation cylinder operable through a commutable or switching valve arrangement to be connection either with a pressurized air source or with a deaeration or venting system, there being connected in the pressurized air duct with is set in action when the clutch is engaged, a throttle arrangement with an air through-flow which is controlable independently of the position of the activation element and/or of the motor rotating speed.

Such a drive device is discontinuously controllable with relatively simple means whereby in addition to the position of the activator element and/or the motor rotating speed allowances may be made for a large number of other parameters, such as for example, the position of the gas pedal of the vehicle and the driving speed thereof. In manually shifted variable gear transmissions, it is particularly possible also to realize different programs, to account for differing requirements during starting and/or during gear change at the higher gears.

The throttle arrangement always controls the clutch engagement operation independently thereof whether pressurized air is admitted to the pneumatic cylinder during the engagement or disengagement process. Customarily, however, the clutch is spring biased into the engaged position so that pressurized air is admitted to the pneumatic cylinder when the clutch is disengaged. Disengagement of the clutch occurs by pneumatic actuation of a force transmission member and the throttle arrangement controls the venting or deaeration process of the pressurized air-activated pneumatic cylinder.

Depending upon the activating path of the activating element of the clutch, several operating areas can be isolated.

Between a disengagement point, at which the clutch is completely disengaged, and an engagement point, at which the clutch is completely engaged, there exists a disengagement area in which no torque is transmitted and brushing or slippage area in which the clutch increasingly begins to grip. The disengagement area should be traversed at the highest possible speed during the engagement of the clutch while the brushing or slipping area should be controlled in accordance with the driving condition. In order that the disengagement area may be traversed as quickly as possible, the throttle arrangement, in a preferred embodiment of the invention, has two flow paths which are commutable or capable of being switched by means of an electrically controllable valve and which have different throttle cross-sections whereby the valve may be switched by means of a switching contact which is operable depending upon the position of the activating element at or immediately before the beginning of the slippage operating condition. The larger throttle section provides that disengagement area of the clutch be traversed as quickly as possible independently of the program which is operative in the slippage operation. The throttle cross-section of the upper flow path is measured in accordance with the requirements of the slippage operation.

For controlling air passage through the throttle arrangement there could be provided a throttle or jet or the like with a controllable cross-section opening. However, with such an approach, the structural control of such a drive would be accordingly elaborate. A simplier solution is provided in that a valve which is electrically controllable by a pulse emitter during engagement of the clutch by means of the pulse emitter generating a series of pulses closed the flow path of the throttle arrangement in its first position and opens it in its other position and wherein there is provided a function generator which controls the duration of the pulses and/or the pulse gaps of the pulse emitter during the slippage operation of the clutch depending upon the rotational speed of the motor. The controllable valve must only switch between two conditions so that, for example, electro-mechanically controllable closing valves or switch-over valves may be used. There may further be installed at minor structural expense emitters or pulse generators having an electrically variable pulse duration or pulse frequency. The function generator permits the setting of desired programs so that different programs for the starting condition and the shifting in higher gears may be set during different driving conditions. The function generator may for example, be a read-only memory which stores the predetermined frequency values assigned to the motor rotating speeds. The reading or sensing of the predetermined frequency values from the read-only memory occurs depending upon the motor rotating speed registered, for example, by means of a tacho generator or the like. The read-only memory may be a component of a micro-processor so that aside from motor rotating speed there may be also taken into consideration, during the setting of the desired frequecy, other operating parameters of the vehicle such as driving speed, gas pedal position and the like. Instead of a read-only memory there may be used net works with set transmitting behavior. In the simplest case, it may be provided that the function generator controls the frequency of the pulse emitter proportionately to engine rotating speed. A control corresponding to an exponential function is also suitable.

In a preferred embodiment of the invention the throttle arrangement is provided with a switch-over valve which alternately connects the pneumatic cylinder with one of two venting throttle paths, as well as two closing valves and the first closing valve is connected between a pneumatic cylinder and a pressurized air source and the second closing valve is connected between one of the outputs or exhausts of the switch-over valve and the venting throttle path assigned to this exhaust. This embodiment has the particular advantage that the operating states of the clutch are controlled independently of one another by means of separate valves which permits the operating states to be better optimized. The first closing valve controls the pressurized air supply to the pneumatic cylinder and with that the release of the clutch. The second closing valve is also connected with the pneumatic cylinder by means of the switch-over valve and in its open condition it opens the venting throttle path with the larger cross sectional flow area during the time that the clutch is undergoing disengagement. During the time that the clutch is undergoing slippage, the second closing valve is closed. By switching over the switch-over valve in accordance with the pulses of the pulse emitter, the venting throttle path having the smaller cross sectional flow area may be opened and/or also closed.

Initiation of the release process of the clutch occurs preferably by way of switching contacts of a control connected with the valve arrangement. At first the switching contact may for example be provided in a gear shift lever of the transmission and it may be operated upon initiation of gear change. For starting in first gear or in reverse, the clutch should also be released. Corresponding release signals may be produced by way of switching contacts which are operated when first gear or reverse gear are engaged, when another switching contact operated at the gas pedal resting position is activated. In other to conserve fuel, there may also be provided an additional manually operable switching contact whereby the clutch may be released when, at the same time, the switching contact responding to the rest position of the gas pedal is operated. Furthermore, switching contacts which are activated when higher gears of the variable gear transmission are engaged could prevent stalling of the engine when the clutch is released if at any time the switching contact responding to the resting position of the gas pedal is operated and moreover the motor rotating speed is smaller than a set value, for example, if the motor speed is below idling speed.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DESCRIPTION OF THE DRAWING

The single FIGURE of drawing is a schematic circuit diagram showing the pneumatic and electrical switching system of the actuating device of the motor vehicle friction disc clutch in accordance with the invention.

DETAILED DESCRIPTION OF THE PREFERRED EMBODIMENT

Referring now to the drawing, wherein there is depicted a system in accordance with the present invention for automatic actuation of the clutch, a motor 1 of a motor vehicle operates to drive by means of a friction disc clutch 3 a multi-gear transmission 5 of the motor vehicle, the gears of the transmission being shifted by means of a manually operable shift lever (not shown) or by a Servo control (not shown). The clutch 3 is constructed in a conventional manner and is biased toward a normally engaged position by means of springs (not shown). Accordingly, when the clutch is not activated it will be in the engaged position. The clutch 3 is connected to a pneumatic cylinder 9 by means of a clutch activating element 7. The pneumatic cylinder 9 operates through the clutch activating element 7 to release the clutch when the cylinder 9 is pressurized by pressurized air from a pressurized air source 11.

The pressurized air source 11 is connected by means of an electromagnetically activated closing valve 13 with the pneumatic cylinder 9. The closing valve 13 is normally closed and opens when it receives an electrical release signal through a line 15 from an electrical control system generally designated by reference 17. Upon termination of the release signal, the closing valve 13 closes so that pressure in the pneumatic cylinder 9 will be maintained and so that the clutch 3 remains disengaged.

In order to engage the clutch 3, the pneumatic cylinder is discontinuously vented so that pressurized air contained within the cylinder 9 may escape. For this purpose, an electromagnetically commutable switch-over valve of 19 is connected with the pneumatic cylinder 9. The valve 19 has connected at its output or exhaust a further electromagetically controlled closing valve 21. The closing valve 21 controls a first venting throttle path which has a throttle cross-section determined essentially by a jet or throttle 23 connected to the exhaust of the closing valve 21. At the other exhaust of the switch-over valve 19 there is connected a further jet or throttle 25 which has a cross-sectional flow area which is dimensioned in such a way that the air passage therethrough is less than the passage through the throttle 23.

In its normal condition, the switch-over valve 19 connects the pneumatic cylinder 9 with the closing valve 21 which is a normally-closed valve. As a result, when the closing valve 13 is opened, pressurized air which has been conducted to the pneumatic cylinder 9 for the purpose of releasing the clutch 3 cannot at first escape. The clutch 3 remains released even after termination of the release signal on the line 15.

For engagement of the clutch, an engagement control element 27 first provides a switching signal to the closing valve 21 whereby the venting throttled path through the throttle 23 will be opened. The venting throttled path through this throttle is dimensioned in such a way that the activating element 7 is moved to the clutch engaged position with a maximum possible speed permitted by the mechanical system. Movement of the activating element 7 is supervised by a position switch 29 which is adjusted in such a manner that at or immediately before the beginning of clutch engagement, during which some clutch slippage or a clutch brushing operating condition exists, it provides a signal to the engagement control element 27. The beginning of the slippage condition is characterised by commencement of torque transmission. In this manner, the clutch 3 goes through the disengagement area between the completely disengaged position and the beginning of torque transmission with a maximum possible speed.

Upon emission of a signal from the position switch 29, the engagement control element 27 closes the closing valve 21 and releases or energizes a pulse generator 31. The pulse generator 31 supplies switching pulses to the switch-over valve 19. During the duration of each such pulse, the switch-over valve 19 switches from a position closed by the closing valve 21 into its other position in which the venting throttled path 25 determines the pressure release in the pneumatic cylinder 9.

The pulse frequency of the pulse generator 31 is determined in dependence upon the rotating speed of the motor 1 by a function generator 33 where the rotating speed of the motor is registered by means of a rotary speed sensor 35 or the like. The function generator 33 may be a network with a suitably selected transmitting function or else it may be read-only memory. It may also possibly be a microprocessor which, beyond that, assumes further functions, for example, that of the engagement control 27.

The output signal of the function generator 33 may change, for example, from a function linearly dependent on the motor rotating speed or in accordance with an exponential function. The function should, however, for adaptation of the engagement characteristics of the torque characteristic of the motor 1, be selected in such a way that the pulse frequency increases with increasing rotational speed. For example, the pulse frequency at a rotating speed of 3000 revolutions per minute may be 20 Hz and at a rotating speed of 1200 Hz it may approach zero.

The process of the engagement of the clutch may be initiated in dependence upon rotational speed. Corresponding instructions are conducted to the engagement control element 27 through the rotational speed sensor 35. In order to also enable starting at higher rotational speed in certain operating situations, the engagement control element 27 may have a timing element which transmits switching signals for switching of the closing valve 21 or the switch-over valve 19 in a time-delayed manner. Thus, the engagement process of the clutch 3 begins with time delay and thus the motor 1 may also accelerate to higher rotational speeds before the clutch 3 begins to grip.

The disengagement process is controlled primarily by means of a switching contact 37 which emits a signal by means of an OR-gate 39 to the closing valve 13 which controls the disengagement operation of the clutch 3. The switching contact 37 registers initiation of gear change, for example, at the beginning of deflection the gear shift lever of the transmission 5. Release of the clutch 3 may however also be controlled through further switching contacts.

A switching contact 40 registers whether first gear or reverse gear of the transmission 5 is engaged.

A switching contact 41 registers the undepressed or resting position of the accelerator pedal of the motor vehicle.

In order also to enable release of the clutch 3 manually under certain driving situations, for example, in order to disengage the motor 1 from the transmission 5 to conserve fuel, there is provided a switching contact 43 which may be operated manually.

A switching contact 45 registers engagement of the higher gears of the transmission, i.e. the second, third or fourth gear.

The switching contacts 40 and 41 are connected with two inputs of an AND-gate 47 connected at its output side with the OR-gate 39. As a result, the clutch 3 is released when the accelerator pedal is in the undepressed position and when at the same time first gear or reverse gear is engaged. This driving situation arises during starting.

The switching contacts 41 and 43 are connected with two inputs of an AND-gate 49 which is also connected on its output side with the OR-gate 39.

When the accelerator pedal is in the undepressed position, then by activation of the switching contact 43, the clutch 3 can be released and braking action of the motor 1 can be eliminated.

The switching contacts 41 and 45 are connected to an AND-gate 51, the output of which is also connected with the OR-gate 39. Connected to a further input of the AND-gate 51 there is a threshold valve stage 53 connected to the rotational speed sensor 35. The threshold valve stage 53 opens the AND-gate 51 for the signals of the switching contacts 43 and 45 when the rotational speed drops below a predetermined value, for example, 1200 r.p.m.

Thus, stalling of the motor 1 is prevented in the higher gears when the motor rotating speed drops below the predetermined value when the accelerator pedal is in the underpressed position.

The OR-gate 39 can have additional inputs through which the clutch 3 is released for further driving situations. The output of the OR-gate 39 is moreover connected with the engagement control element 27 and sets the engagement control element for the engagement process which is dependent upon rotational speed. The engagement process may also, if necessary, be initiated in dependence upon the position of the accelerator pedal.

While a specific embodiment of the invention has been shown and described in detail to illustrate the application of the inventive principles, it will be understood that the invention may be embodied otherwise without departing from such principles.

What is claimed is:

1. A system for automatic actuation of the clutch means of a motor vehicle provided with a multiple gear transmission and with means for shifting said transmission including a motor comprising pneumatic cylinder means for effecting engagement and disengagement of said clutch means in accordance with fluid pressure in said cylinder means; connecting means operatively joining said pneumatic cylinder means with said clutch means; fluid pressure source means from which fluid pressure may be supplied to said cylinder means; vent means through which fluid pressure may be vented from said cylinder means; valve means for controlling delivery of fluid pressure to said cylinder means from said fluid pressure source means and for venting of fluid pressure from said cylinder means through said vent means; and control means for controlling operation of said valve means in dependence upon the position of said connecting means and the speed of said motor, said control means including switching contact means responsive to the operating condition of said transmission to effect engagement or disengagement of said clutch; said switching contact means including a first switching contact operable at initiation of gear change of said transmission, a second switching contact operable when said transmission is engaged in one of a first gear or a reverse gear, a third switching contact operable when higher gears of said transmission are engaged and a fourth switching contact operable in an undepressed position of an accelerator pedal of said motor vehicle, with a manually operable fifth switching contact being provided, said control means including means for switching said valve means into a position assigned to disengagement operation when either of said first switching contact or said second switching contact and said fourth switching contact are operated together or when said fourth switching contact and said fifth switching contact are operated together or when said third switching contact and said fourth switching contact are together and at the same time the rotational speed of said motor is below a set value.

2. A system according to claim 1 wherein said vent means include throttling means having two throttling ducts with different throttle cross-sectional flow areas, wherein said valve means include electrically controlled valve means, and wherein said control means include position switch means responsive to the position of said connecting means for switching said electrically controlled valve means, said electrically controlled valve means operating to effect switching of said vent means between said two connecting means during engagement of said clutch means.

3. A system according to claim 2 wherein said control means include pulse emitter means for generating a series of pulses for controlling said electrically controlled valve means to effect switching of said vent means from one of said two throttling ducts to the other, and function generator means for controlling the duration of individual pulses emitted by said pulse emitter means.

4. A system according to claim 3 wherein said function generator means controls the frequency of said pulses in dependence upon the rotating speed of said motor.

5. A system according to claim 3 wherein said function generator means controls the frequency of said pulses proportionately to the rotating speed of said motor.

6. A system according to claim 3 wherein said function generator means controls the frequency of pulses in accordance with an exponential function.

7. A system according to claim 1 wherein said clutch means is biased in the normally engaged condition and wherein said cylinder means operate to disengage said clutch means when connected with said fluid pressure source means.

8. A system according to claim 7 wherein said valve means comprise a first closing valve, a second closing valve and a switching valve, wherein said vent means comprise two throttling vents and wherein said switching valve operates to connect said pneumatic cylinder means alternately with one of said two throttling vents as well as said first and second closing valves, said first closing valve being connected between said cylinder means and said fluid pressure source means, and said second closing valve being connected between an output of said switching valve and one of said throttling vents assigned to this output.

* * * * *